Sept. 26, 1961  T. BUDZICH ET AL  3,001,360
ENGINE STARTING SYSTEM
Filed June 8, 1959

INVENTORS
Tadeusz Budzich
and Melvin L. Kent
BY
Dodge and Sons
ATTORNEYS

United States Patent Office 3,001,360
Patented Sept. 26, 1961

3,001,360
ENGINE STARTING SYSTEM
Tadeusz Budzich, Cleveland, Ohio, and Melvin L. Kent, Watertown, N.Y., assignors to The New York Air Brake Company, a corporation of New Jersey
Filed June 8, 1959, Ser. No. 818,604
7 Claims. (Cl. 60—18)

This invention relates to hydraulic starting devices for vehicle propulsion engines.

In many vehicles, especially airplanes, it is necessary to provide a motor for starting the propulsion engine and a hydraulic pump driven by the engine for supplying pressure fluid to the various power-operated devices carried by the vehicle. In the past, several different types of starters have been employed; for example, electric motors, fuel-air combustion turbines, air turbines, and solid propellant turbines. In each of these cases, with the possible exception of the electric motor, the starter and its associated circuitry performed no useful function once the propulsion engine had been started. This resulted in an inefficient utilization of space within and contributed unnecessarily to the weight of the vehicle.

Budzich and Manning copending application Serial No. 789,996, filed January 29, 1959, discloses a hydraulic starter comprising a rotary cylinder barrel longitudinally reciprocating piston hydraulic engine or motor-pump unit of the over-center type, i.e., a hydraulic motor-pump unit that includes an angularly adjustable cam plate which governs the length of the piston strokes and which is movable between maximum stroke-establishing positions on opposite sides of a neutral or zero stroke-establishing position. This type of starter is superior to its predecessors because it functions as both a pump and a motor and thus conserves space and weight. However, it has one drawback: it requires a source of high pressure hydraulic oil in order to start the propulsion engine. Since this requirement necessitates the use of special ground support equipment, the usefulness of the hydraulic starter is limited.

The object of this invention is to provide a self-contained pumping system for overcenter hydraulic starters which is carried by the vehicle and which supplies the required high pressure oil during the starting operation and then serves as the system reservoir once the propulsion engine has been started. According to the invention, the pumping system comprises a double-acting piston pump which is driven by a self-contained motor and is connected, by a closed circuit, with the overcenter hydraulic motor-pump unit and with the hydraulic work circuit supplied by that unit. Preferably, the self-contained motor is a double-acting piston motor utilizing the combustion gases of a solid propellant fuel as the motive fluid. When the solid propellant is ignited, the motor, under the action of the combustion gases, reciprocates the piston pump and causes it to supply high pressure starting oil to the hydraulic motor-pump unit; the oil which discharges from the low pressure side of the hydraulic motor-pump unit being returned to the piston pump. The size of the solid propellant charge is so selected that the propellant will be completely consumed at the time the propulsion engine starts. When the propulsion engine is running under its own power, the cam plate of the hydraulic motor-pump unit will shift overcenter and that unit will become a pump which draws fluid from the return line connecting it with the double-acting piston pump. The double-acting piston pump may be connected either in series or in parallel with the hydraulic work circuit but in each case its working chambers serve as the system reservoir when the self-contained motor is idle and the hydraulic motor-pump unit is pumping.

The preferred embodiment of the invention will now be described in detail with reference to the accompanying drawing, in which.

Figure 1:
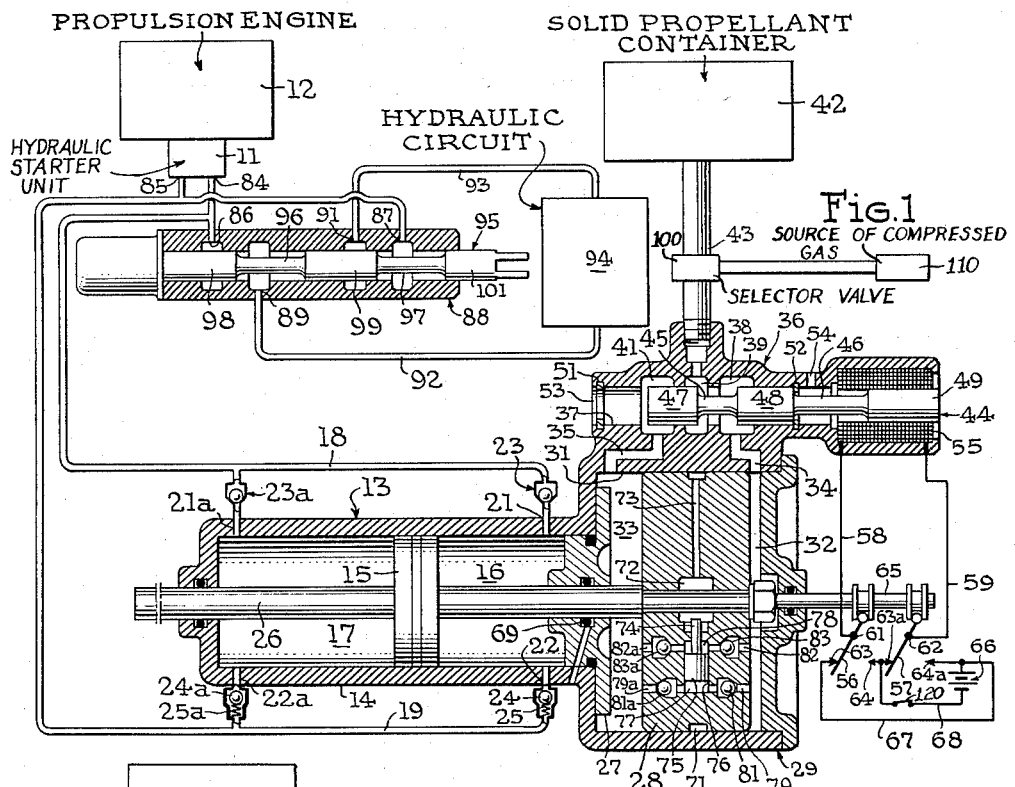
FIG. 1 is a schematic diagram of the pumping system showing the double-acting piston pump connected in parallel with the work circuit.

As shown in FIG. 1, the pumping system is associated with an overcenter hydraulic starter or motor-pump unit 11 which is connected to drive and be driven by the turbo-jet propulsion engine 12. The motor-pump unit is of the type shown in Budzich and Manning application Serial No. 789,996, mentioned above. This unit includes a discharge pressure compensator which, when the unit is pumping, serves to vary displacement in inverse relation to discharge pressure and thereby maintain a preselected maximum discharge pressure. The pumping system includes a double-acting piston pump 13 having a cylinder 14, a double-acting equal area piston 15, and a pair of working chambers 16 and 17. The working chamber 16 is connected with supply and return lines 18 and 19 through outlet and inlets ports 21 and 22 and check valves 23 and 24, respectively. Similar ports 21a and 22a and check valves 23a and 24a connect working chamber 17 with the lines 18 and 19. The check valves 24 and 24a are biased to the open position by springs 25 and 25a for a purpose which will become apparent as the description proceeds.

The piston 15 is mounted on a piston rod 26 which extends through the end wall 27 of working chamber 16 and is connected with the double-acting piston 28 of the self-contained motor 29. Piston 28 reciprocates in a bore 31 and divides that bore into two opposed working chambers 32 and 33. These working chambers 32 and 33 are provided with motor ports 34 and 35, respectively, through which they are alternately and reversely vented and pressurized by a distributing valve 36.

The distributing valve 36 comprises a housing having a through bore 37 which is encircled by three spaced annular chambers 38, 39 and 41; the annular chambers 38 and 41 communicating with motor ports 34 and 35, respectively, and the chamber 39 communicating with the solid propellant container or combustion chamber 42 via line 43. Reciprocable in bore 37 is a valve plunger 44 formed with two spaced grooves 45 and 46 that define three valve lands 47, 48 and 49. Two snap rings 51 and 52, mounted in grooves formed in the surface of bore 37, serve as limit stops for plunger 44. The lands 47 and 48 are so dimensioned that when the right edge of land 48 abuts ring 52, groove 45 interconnects chambers 38 and 39, and port 35 communicates with the open end 53 of bore 37; and when the left edge of land 47 abuts the ring 51, groove 45 interconnects annular chambers 39 and 41, and port 34 communicates with the radial vent passage 54 through the groove 46.

Valve land 49 is disposed within and functions as the armature of a solenoid coil 55 which together with its actuating circuit serves to reciprocate plunger 44 in timed relation to the movement of pistons 15 and 28. The opposite ends of coil 55 are connected with switch arms 56 and 57 by leads 58 and 59. These arms are pivoted at the points 61 and 62 and are shifted between pairs of contacts 63, 64 and 63a, 64a by an actuating device 65 attached to the right end of piston rod 26. Contacts 63 and 64a are connected with the positive terminal of battery 66 by lead 67, and contacts 63a and 64 are connected with the negative terminal of this battery by lead 68.

Since the motor working chambers 32 and 33 will, during operation, contain hot combustion gases under pressure, a vented sealing groove 69 is formed in the wall 27 for preventing comingling of these gases and the hydraulic oil in working chamber 16. Leakage between working chambers 32 and 33 along the surface of bore 31 is prevented by a high pressure grease seal which is carried by piston 28. This seal comprises an annular groove 71 formed in the outer periphery of the piston and connected with a central grease chamber 72 by passage 73. Extending into chamber 72 is the small diameter end 74 of a grease plunger 75 which reciprocates in bore 76 and defines therewith opposed working chambers 77 and 78. The working chamber 77 is connected with motor working chambers 32 and 33 through passages 79 and 79a and check valves 81 and 81a, and the working chamber 78 is connected with motor working chambers 32 and 33 through passages 82 and 82a and check valves 83 and 83a. The check valves 81 and 81a are reversely set relatively to check valves 83 and 83a with the result that working chamber 77 is always connected with whichever of the working chambers 32, 33 is at the higher pressure and working chamber 78 is always connected with whichever of these chambers is at the lower pressure. This pressure differential between chambers 77 and 78 develops a force on plunger 75 urging end 74 into grease chamber 72 thereby forcing grease from this chamber to the groove 71. Since the cross-sectional area of plunger 75 is greater than the cross-sectional area of end 74, the grease pressure in groove 71 will always be higher than the pressure in the working chambers 32 and 33 and, as a result, leakage of gas between these chambers is prevented.

The supply and return lines 18 and 19 are connected with the high and low pressure ports 84 and 85, respectively, of motor-pump unit 11 and with the inlet and exhaust ports 86 and 87, respectively, of the selector valve 88. The selector valve 88 is also provided with two system ports 89 and 91 which are connected by lines 92 and 93 with opposite sides of the hydraulic work circuit 94, and with a plunger 95 having grooves 96 and 97 and lands 98, 99 and 101 for controlling communication between the four ports 86, 87, 89 and 91.

*Operation*

In use, the hydraulic lines and components are filled with hydraulic oil and the container 42 is stocked with a charge of solid propellant. When the propellant is ignited, the hot gases which are generated flow through line 43, annular chamber 39, plunger groove 45, annular chamber 38, and port 34 to motor working chamber 32 where they act upon piston 28. Since, at this time, motor working chamber 33 is vented to atmosphere via port 35, annular chamber 41, bore 37 and opening 53, the piston 28 moves to the left carrying with it the piston rod 26 and the pump piston 15. This movement of pump piston 15 expels hydraulic oil from working chamber 17 to supply line 18 through port 21a and check valve 23a; the check valve 24a closing against the bias of spring 25a. The oil under high pressure in line 18 passes into the high pressure port 84 of the motor-pump unit 11, produces rotation of its cylinder barrel and of the turbine shaft of propulsion engine 12, and is discharged under low pressure from port 85. The oil returns to the pump working chamber 16 through return line 19, check valve 24 and port 22.

As the pistons 15 and 28 and the piston rod 26 move to the left, the actuating device 65 swings switch arms 56 and 57 in the counterclockwise direction away from contacts 63 and 63a thereby opening the circuit from battery 66 to solenoid 55. This, however, does not change the position of distributing valve plunger 44; that plunger remains in the illustrated position until the piston rod 26 moves to a position in which device 65 brings switch arms 56 and 57 into engagement with contacts 64 and 64a. When the piston rod 26 reaches that position, a circuit including lead 67, contact 64a, switch arm 57, lead 59, coil 55, lead 58, switch arm 56, contact 64, and lead 68 is established between the positive and negative terminals of battery 66, and plunger 44 is shifted to the left into contact with ring 51 under the action of the magnetic force developed by coil 55.

In its new position, the plunger 44 vents motor working chamber 32 through port 34, annular chamber 38, plunger groove 46, and vent passage 54, and connects the opposite chamber 33 with the propellant container 42 through port 35, annular chamber 41, plunger groove 45, annular chamber 39, and line 43. This reversal of the pressures in the two motor working chambers 32 and 33 forces the motor piston 28 to the right causing pump piston 15 to expel hydraulic oil from working chamber 16 through port 21 and check valve 23. This high pressure oil is conveyed to the high pressure port 84 of the motor-pump unit 11 and, after it has performed its work in that unit, is returned to the pump working chamber 17 through line 19, check valve 24a, and port 22a. When the piston rod 26 again reaches the position shown in FIG. 1, the flow of current through solenoid 55 is reversed and the high pressure combustion gases are again ported to working chamber 32 and working chamber 33 is again vented to atmosphere.

The pumping device continues to operate in this manner until the supply of propellant fuel is exhausted. The size of the charge of propellant is so selected that the number of cycles of motor 29 which it produces is sufficient to start the propulsion engine 12.

When the propulsion engine begins to run under its own power and the "cut-out" speed of hydraulic motor-pump unit 11 is reached, the cam plate of that unit moves overcenter to the pumping side of the neutral or zero stroke-establishing position. The effect of this shift of the cam plate is to retain port 84 as the high pressure port and port 85 as the low pressure port when the motor pump unit is pumping.

The high pressure oil pumped by motor-pump unit 11 through high pressure port 84 passes into supply line 18 but because of the presence of check valves 23 and 23a, none of this fluid passes into working chambers 16 and 17. When the selector valve plunger 95 is shifted to the left, grooves 96 and 97 interconnect ports 86 and 89 and ports 87 and 91, respectively, so that the high pressure oil discharged by motor-pump unit 11 flows into the work circuit 94 through line 92 and is returned to line 19 via line 93. The major portion of the oil supplied to the low pressure port 85 of motor-pump unit 11 comes from the hydraulic circuit via line 93, but, if the circuit 94 contains accumulators or differential area motors, the additional fluid required is taken from the piston pump working chambers 16 and 17 through check valves 24 and 24a and line 19. The springs 25 and 25a maintain these check valves open and thus permit this flow of additional fluid as long as the demand is not too great. If the demand for additional oil from the pump 13 (which now is acting as a reservoir) is so great that the pressure differential across valves 24 and 24a closes them against the bias of springs 25 and 25a, the series arrangement of FIG. 2 should be used.

Figure 2:
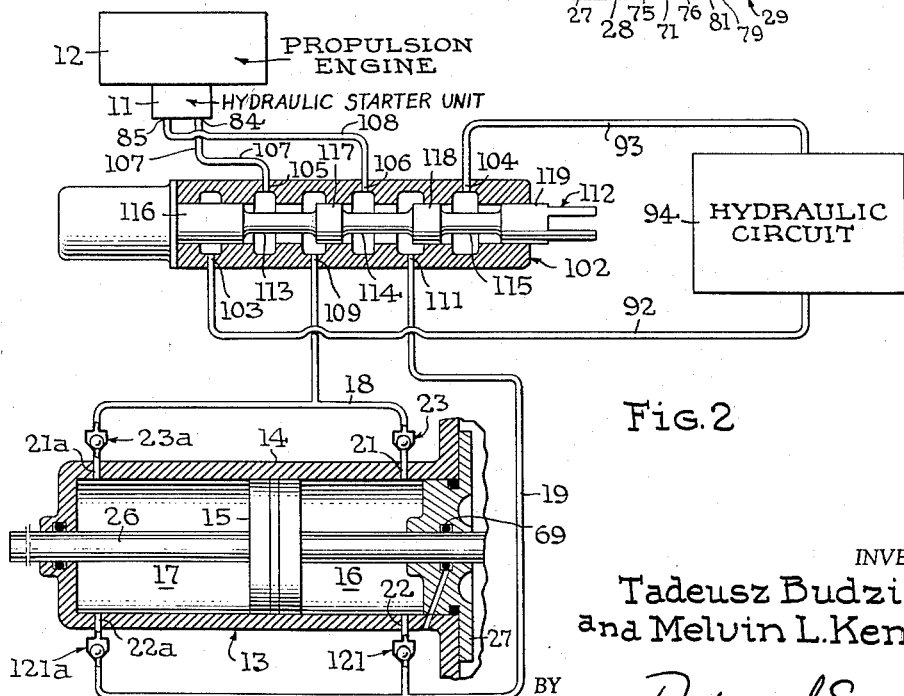
FIG. 2 is a schematic diagram of the pumping system showing the double-acting piston pump connected in series with the work circuit.

In the FIG. 2 embodiment, the selector valve 88 is replaced by a selector valve 102 which controls flow between pump 13 and motor-pump unit 11 as well as flow between the unit 11 and hydraulic work circuit 94. The valve 102 is provided with six ports, namely, two work circuit ports 103 and 104 which are connected by lines 92 and 93, respectively, with the hydraulic circuit 94, two motor-pump unit ports 105 and 106 which are connected by lines 107 and 108, respectively, with the high and low pressure ports 84 and 85 of starter unit 11, and two pump-reservoir ports 109 and 111 which are connected with pump 13 by lines 18 and 19, respectively. Valve 102 also includes a plunger 112 having three grooves 113 to 115 and four lands 116 to 119 for controlling communication between the six ports. It will be observed that the check valves 121 and 121a interposed between the ports 22 and 22a, respectively, of pump 13 and return line 19 do not contain the biasing springs employed in their FIG. 1 counterparts 24 and 24a.

During the starting operation of the FIG. 2 embodiment, high pressure oil expelled from the working chambers 16 and 17 of pump 13 is delivered to the high pressure port 84 of motor-pump unit 11 through ports 21 and 21a, check valves 23 and 23a, supply line 18, port 109, plunger groove 113, port 105, and line 107, and the low pressure fluid discharged from port 85 of unit 11 is returned to these working chambers by line 108, port 106, plunger groove 114, port 111, return line 19, check valves 121 and 121a, and ports 22 and 22a. When the propulsion engine 12 has started and is running under its own power, plunger 112 of selector valve 102 is shifted to the left causing plunger groove 113 to interconnect ports 103 and 105 and thus transmit the high pressure oil discharging from port 84 of motor-pump unit 11 to the hydraulic circuit 94. Simultaneously, plunger groove 115 interconnects ports 104 and 111, and plunger groove 114 interconnects ports 106 and 109. As a result, the oil exhausting into line 93 from the hydraulic circuit 94 is passed through the working chambers 16 and 17 of pump 13 before it is returned to the low pressure port 85 of the motor-pump unit 11.

It should be noted that in either the FIG. 1 or the FIG. 2 embodiment, one of the working chambers 16 or 17 can be converted into a pressurized reservoir, after the starting operation is complete, by shifting selector valve 100 to a position in which annular chamber 39 is disconnected from container 42 and connected with the source of compressed gas 110. Simultaneously, switch 120 is opened to prevent reciprocation of pistons 15 and 28.

As stated previously, the drawings and description relate only to a preferred embodiment of the invention. Since many changes can be made in the structure of this embodiment without departing from the inventive concept, the following claims should provide the sole measure of the scope of the invention.

What is claimed is:

1. In a vehicle having an internal combustion propulsion engine, an overcenter hydraulic motor-pump unit arranged to drive and be driven by the propulsion engine, and a hydraulic work circuit, the improvement which comprises a double-acting reciprocating piston pump; self-contained motor means for reciprocating the piston pump; and a flow circuit, including shiftable valve means, connected with the motor-pump unit, the piston pump and the hydraulic work circuit, said flow circuit being effective in one position of the shiftable valve means to interconnect the motor-pump unit and the piston pump and isolate the work circuit, and in another position of the shiftable valve means to interconnect the motor-pump unit, the piston pump and the work circuit.

2. In a vehicle having an internal combustion propulsion engine, an overcenter hydraulic motor-pump unit having high and low pressure ports and arranged to drive and be driven by the propulsion engine, and a hydraulic work circuit having high and low pressure sides, the improvement which comprises a piston pump having a cylinder, a double-acting piston, and two closed working chambers; inlet and outlet ports for each working chamber; self-contained motor means for reciprocating the double-acting piston; supply passages connecting the output ports with the high pressure port of the motor-pump unit; a check valve located in each supply passage for preventing flow from the motor-pump unit to the working chambers; return passages connecting the inlet ports with the low pressure port of the motor-pump unit; a flow-responsive check valve located in each return passage for preventing flow above a predetermined rate from the working chambers to the motor-pump unit; distribution passages connecting the high and low pressure sides of the work circuit with the high and low pressure ports of the motor-pump unit; and valve means for selectively opening and closing the distribution passages.

3. In a vehicle having an internal combustion propulsion engine, an overcenter hydraulic motor-pump unit having high and low pressure ports and arranged to drive and be driven by the propulsion engine, and a hydraulic work circuit having high and low pressure sides, the improvement which comprises a piston pump having a cylinder, a double-acting piston, and two closed working chambers; inlet and outlet ports for each working chamber; self-contained motor means for reciprocating the double-acting piston; supply passages connecting with the outlet ports; a check valve located in each supply passage for preventing reverse flow into the working chambers; return passages connected with the inlet ports; a check valve located in each return passage for preventing flow from the working chambers; and a valve connected in circuit with the motor-pump unit, the work circuit and the piston pump, and having a first operative position in which the supply and return passages are connected with the high and low pressure ports, respectively, of the motor-pump unit, and a second operative position in which the supply passages are connected with the low pressure port of the motor-pump unit, the high pressure port of the motor-pump unit is connected with the high pressure side of the work circuit, and the low pressure side of the work circuit is connected with the return passages.

4. The improvement defined in claim 1 in which the self-contained motor means comprises a closed cylinder; a double-acting piston reciprocable in the cylinder and defining with the closed ends thereof two opposed motor working chambers; means connecting the double-acting motor piston with the double-acting pump; a motor port associated with each motor working chamber; a source of pressure gas; a distributing valve shiftable between a first operative position in which one motor port is connected with the source and the other is vented, and a second operative position in which said one motor port is vented and said other port is connected with the source; and means for reciprocating the valve between its operative positions in timed relation to the movement of the double-acting motor piston.

5. The improvement defined in claim 4 in which the effective area of the double-acting motor piston is greater than the effective area of the double-acting pump piston.

6. The improvement defined in claim 4 including an annular groove formed in the periphery of the motor piston; a closed sealant chamber formed in the motor piston; a flow path connecting the chamber with the annular groove; a bore formed in the motor piston and intersecting the chamber; a plunger reciprocable in the bore; an expansible chamber motor carried by the motor piston and having a working chamber and a movable abutment connected with the plunger, said abutment being subject to the pressure in the working chamber for urging the plunger into the sealant chamber; and means for connecting the working chamber of the expansible chamber motor with whichever working chamber of the double-acting motor contains the higher pressure.

7. The improvement defined in claim 6 in which the effective area of the movable abutment is greater than the effective area of the plunger.

References Cited in the file of this patent

UNITED STATES PATENTS

| | | |
|---|---|---|
| 2,171,257 | Nardone | Aug. 29, 1939 |
| 2,230,760 | Pateras Pescara | Feb. 4, 1941 |
| 2,391,972 | Hufford et al. | Jan. 1, 1946 |
| 2,557,933 | Beaman et al. | June 26, 1951 |
| 2,652,781 | Deardorff et al. | Sept. 22, 1953 |